(12) United States Patent
Binkley et al.

(10) Patent No.: US 8,430,380 B2
(45) Date of Patent: Apr. 30, 2013

(54) FLUID DISPERSION UNIT ASSEMBLY AND METHOD

(75) Inventors: Michael J. Binkley, Glenn Heights, TX (US); Casey Bowles, Pearland, TX (US)

(73) Assignee: GTC Technology US LLC, Houston, TX (US)

( * ) Notice: Subject to any disclaimer, the term of this patent is extended or adjusted under 35 U.S.C. 154(b) by 0 days.

(21) Appl. No.: 13/340,245

(22) Filed: Dec. 29, 2011

(65) Prior Publication Data

US 2012/0118399 A1 May 17, 2012

Related U.S. Application Data

(63) Continuation of application No. 12/109,781, filed on Apr. 25, 2008.

(60) Provisional application No. 60/926,707, filed on Apr. 27, 2007.

(51) Int. Cl.
B01F 3/04 (2006.01)

(52) U.S. Cl.
USPC .................................. 261/114.4; 261/114.5

(58) Field of Classification Search ............... 261/114.4, 261/114.5
See application file for complete search history.

(56) References Cited

U.S. PATENT DOCUMENTS

| | | | |
|---|---|---|---|
| 2,582,826 A | 1/1952 | Glitsch | |
| 2,718,901 A | 9/1955 | Nutter | |
| 2,752,229 A | 6/1956 | Brown et al. | |
| 2,787,453 A | 4/1957 | Hibshman et al. | |
| 2,853,281 A | 9/1958 | Hibshman et al. | |
| 2,903,251 A | 9/1959 | Thrift | |
| 2,951,691 A | 9/1960 | Nutter | |
| 3,039,751 A | 6/1962 | Versluis | |
| 3,146,280 A | 8/1964 | Forgrieve | |
| 3,233,708 A | 2/1966 | Glitsch | |
| 3,245,669 A | 4/1966 | Huggins et al. | |
| 3,282,576 A | 11/1966 | Bruckert et al. | |
| 3,287,004 A | 11/1966 | Nutter | |
| 3,338,566 A | 8/1967 | Kittel | |
| 3,399,871 A | 9/1968 | Bon | |
| 3,463,464 A | 8/1969 | Nutter et al. | |
| 3,729,179 A | 4/1973 | Keller | |
| 3,759,494 A | 9/1973 | Axelrod et al. | |
| 3,959,419 A | 5/1976 | Kitterman | |
| 4,120,919 A | 10/1978 | McClain | |

(Continued)

OTHER PUBLICATIONS

Kim, SooWoong et al., "U.S. Appl. No. 13/401,601," filed Feb. 21, 2012.

(Continued)

*Primary Examiner* — Robert A Hopkins
(74) *Attorney, Agent, or Firm* — Winstead PC

(57) ABSTRACT

A tray valve assembly for a process column of a type wherein a first, heavier fluid interacts with a second, lighter fluid. A plurality of valves are disposed on a surface of the tray. Each valve of the plurality of valves includes a top surface and at least one securement leg. A first securement leg of is adapted to intercept the first, heavier fluid flow thereby forming a diverting baffle. Each valve includes at least one aperture to facilitate the second, lighter fluid flow therefrom. The at least one aperture is adapted to allow the second, lighter fluid to interact with the first, heavier fluid. Each valve includes a plurality of open side regions. Each valve is adapted to allow the second, lighter fluid to pass outwardly therefrom generally in a direction of the first heavier fluid.

22 Claims, 5 Drawing Sheets

U.S. PATENT DOCUMENTS

| | | | |
|---|---|---|---|
| 4,133,852 A | 1/1979 | DiNicolantonio et al. |
| 4,174,363 A | 11/1979 | Bruckert |
| 4,201,626 A | 5/1980 | Asdigian |
| 4,207,174 A | 6/1980 | Christman |
| 4,247,521 A | 1/1981 | Forte et al. |
| 4,275,021 A | 6/1981 | Kirkpatrick et al. |
| 4,374,786 A | 2/1983 | McClain |
| 4,499,035 A | 2/1985 | Kirkpatrick et al. |
| 4,504,426 A | 3/1985 | Chuang et al. |
| 4,519,960 A | 5/1985 | Kitterman et al. |
| 4,528,068 A | 7/1985 | Fiocco et al. |
| 4,543,219 A | 9/1985 | Yamato et al. |
| 4,550,000 A | 10/1985 | Bentham |
| 4,597,916 A | 7/1986 | Chen |
| 4,603,022 A | 7/1986 | Yoneda et al. |
| 4,604,247 A | 8/1986 | Chen et al. |
| 4,710,326 A | 12/1987 | Seah |
| 4,729,857 A | 3/1988 | Lee et al. |
| 4,816,191 A | 3/1989 | Berven et al. |
| 4,842,778 A | 6/1989 | Chen et al. |
| 4,855,089 A | 8/1989 | Michels |
| 4,909,967 A | 3/1990 | Binkley et al. |
| 4,956,127 A | 9/1990 | Binkley et al. |
| 4,981,265 A | 1/1991 | Buhlmann |
| 5,051,214 A | 9/1991 | Chen et al. |
| 5,098,615 A | 3/1992 | Resetarits |
| 5,106,556 A | 4/1992 | Binkley et al. |
| 5,120,474 A | 6/1992 | Binkley et al. |
| 5,147,584 A | 9/1992 | Binkley et al. |
| 5,164,125 A | 11/1992 | Binkley et al. |
| 5,192,465 A | 3/1993 | Petrich et al. |
| 5,192,466 A | 3/1993 | Binkley |
| 5,277,848 A | 1/1994 | Binkley et al. |
| 5,453,222 A | 9/1995 | Lee et al. |
| 5,468,425 A | 11/1995 | Nutter |
| 5,547,617 A | 8/1996 | Lee et al. |
| 5,573,714 A | 11/1996 | Monkelbaan et al. |
| 5,762,834 A | 6/1998 | Hauser et al. |
| 5,783,119 A | 7/1998 | Ulrich et al. |
| 5,895,608 A | 4/1999 | Lee et al. |
| 5,906,773 A | 5/1999 | Hausch et al. |
| 5,911,922 A | 6/1999 | Hauser et al. |
| 5,921,109 A | 7/1999 | Billingham et al. |
| 6,053,484 A | 4/2000 | Fan et al. |
| 6,068,244 A | 5/2000 | Burton et al. |
| 6,089,550 A | 7/2000 | Petschauer et al. |
| 6,113,079 A | 9/2000 | Urbanski et al. |
| 6,145,816 A | 11/2000 | Chuang et al. |
| 6,224,043 B1 | 5/2001 | Fan et al. |
| 6,293,526 B1 | 9/2001 | Fischer et al. |
| 6,422,539 B1 | 7/2002 | Burton et al. |
| 6,502,806 B2 | 1/2003 | Richardson |
| 6,540,213 B2 | 4/2003 | Bachmann et al. |
| 6,575,437 B2 | 6/2003 | Fischer et al. |
| 6,588,736 B1 | 7/2003 | Chuang et al. |
| 6,592,106 B1 | 7/2003 | Eaton, Jr. |
| 6,629,687 B1 | 10/2003 | Gage |
| 6,722,639 B2 | 4/2004 | Ender et al. |
| 6,739,585 B1 | 5/2004 | Urbanski et al. |
| 6,799,752 B2 | 10/2004 | Wu et al. |
| 6,962,661 B2 | 11/2005 | Northup, Jr. et al. |
| 7,045,103 B2 | 5/2006 | McDougald et al. |
| 7,052,654 B2 | 5/2006 | McDougald et al. |
| 7,078,002 B2 | 7/2006 | Van Vliet et al. |
| 7,125,004 B2 | 10/2006 | Dollie et al. |
| 7,235,158 B2 | 6/2007 | Matsumoto et al. |
| 7,270,315 B2 | 9/2007 | Burton et al. |
| 7,556,734 B2 | 7/2009 | Lee et al. |
| 7,712,728 B2 | 5/2010 | Kehrer |
| 7,896,039 B2 | 3/2011 | Bachmann et al. |
| 8,006,716 B2 | 8/2011 | Zhang et al. |
| 2002/0041040 A1 | 4/2002 | Fischer et al. |
| 2003/0067085 A1 | 4/2003 | Shakur et al. |
| 2004/0182013 A1 | 9/2004 | Kehrer |
| 2007/0126134 A1 | 6/2007 | Xu et al. |
| 2007/0295591 A1 | 12/2007 | Mosler |
| 2008/0245651 A1 | 10/2008 | Werlen et al. |
| 2008/0277260 A1 | 11/2008 | Binkley et al. |
| 2010/0288624 A1 | 11/2010 | Kim et al. |
| 2012/0024977 A1 | 2/2012 | Buttridge et al. |
| 2012/0211347 A1 | 8/2012 | Kim et al. |
| 2012/0300577 A1 | 11/2012 | Buttridge et al. |

OTHER PUBLICATIONS

Buttridge, Ian et al., "U.S. Appl. No. 13/449,122," filed Apr. 17, 2012.
Binkley, Michael, "U.S. Appl. No. 12/408,333," filed Mar. 30, 2009.
Buttridge, Ian G. "U.S. Appl. No. 12/418,189," filed Apr. 3, 2009.
Buttridge, Ian G., "U.S. Appl. No. 13/564,881," filed Aug. 2, 2012.
Kister, Henry Z., "Distillation Design", ch. 6, pp. 265, 296, 331, 299-301, ch. 7, pp. 382-394, ch. 9, pp. 537-554, McGraw-Hill, 1992.
U.S. Appl. No. 12/408,333, Binkley.
U.S. Appl. No. 12/775,895, Kim, SooWoong et al.
U.S. Appl. No. 12/418,189, Buttridge et al.
U.S. Appl. No. 13/101,638, Buttridge et al.
Glitsch, Inc., "Ballast Tray Design Manuel", Bulletin 4900, Sixth Edition, 1993, (40 pages).
Kister, Henry Z., "Distillation Design", McGraw-Hill, 1992.
Axens IFP Group Technologies, "Equiflow Reactor Internals for Optimal Catalyst Utilization", Axens Process Licensing, Jun. 2006, 4 pages.
GTC Technology, "GT-BenZap Technology Licensing". Engineered to Innovate, 2009, 2 pages.
Shell, "Shell Global Solutions' Portfolio for Reactor Engineering Technology", Shell Global Solutions, 2002, 3 pages.
Young, Lee W., "International Search Report" for the International Application PCT/IB11/02695 as mailed Apr. 17, 2012. (4 pages).
U.S. Appl. No. 13/401,601, Kim, SooWoong et al.
U.S. Appl. No. 13/449,122, Buttridge, et al.

ained during the heavier fluid flow across the plate. This generally forms along the lateral portions thereof. These currents carry the heavier fluid back across the tray in a manner that reduces the concentration-difference driving force for mass transfer. It is the concentration-difference between the lighter fluid and the heavier fluid which enhances the effectiveness of the fluid-fluid contact.

FLUID DISPERSION UNIT ASSEMBLY AND METHOD

CROSS-REFERENCE TO RELATED APPLICATIONS

This patent application is a continuation of U.S. patent application Ser. No. 12/109,781, filed Apr. 25, 2008. U.S. patent application Ser. No. 12/109,781 claims priority from U.S. Provisional Patent Application No. 60/926,707, filed Apr. 27, 2007. U.S. patent application Ser. No. 12/109,781 and U.S. Provisional Patent Application No. 60/926,707 are each incorporated herein by reference.

BACKGROUND OF THE INVENTION

1. Field of the Invention

The present invention relates to fluid-fluid contacting trays and, more particularly, but not by way of limitation, to an improved fluid impingement device and tray assembly incorporating fluid-deflector surfaces with multiple fluid-flow apertures for higher efficiency operation, which, in one embodiment, includes gas-liquid contacting trays incorporating fixed or floating valves with multiple vapor apertures.

2. History of Related Art

Distillation columns are utilized to separate selected components from a multicomponent stream. Generally, such contact columns utilize either trays, packing, or combinations thereof. In certain years the trend has been to replace so-called "bubble caps" by sieve and valve trays in most tray column designs.

Successful fractionation in the column is dependent upon intimate contact between heavier fluids and lighter fluids. Some contact devices, such as trays, are characterized by relatively high pressure drop and relatively high fluid hold-up. One type of contact apparatus utilizes fluid in the vapor phase to contact fluid in the liquid phase and has become popular for certain applications. Another type of contact apparatus is high-efficiency packing, which is energy efficient because it has low pressure drop and low fluid hold-up. However, these very properties at times make columns equipped with structured packing difficult to operate in a stable, consistent manner. Moreover, many applications simply require the use of trays.

Fractionation column trays come in two configurations: cross-flow and counter flow. The trays generally consist of a solid tray or deck having a plurality of apertures and are installed on support rings within the column. In cross-flow trays, lighter fluid ascends through the apertures and contacts heavier fluid moving across the tray, through the "active" area thereof. In this area, the heavier fluid and the lighter fluid mix and fractionation occurs. The heavier fluid is directed onto the tray by means of a vertical channel from the tray above. This channel is referred to as the Inlet Downcomer. The heavier fluid moves across the tray and exits through a similar channel referred to as the Exit Downcomer. The location of the downcomers determines the flow pattern of the heavier fluid. If there are two Inlet Downcomers and the heavier fluid is split into two streams over each tray, it is called a two pass tray. If there is only one Inlet and one Outlet Downcomer on opposite sides of the tray, it is called a single pass tray. For two or more passes, the tray is often referred to as a Multipass Tray. The number of passes generally increases as the required (design) flow rate increases. It is the active area of the tray, however, which is of critical concern.

Addressing now select flow designs, a particularly effective tray in process columns is the sieve tray. This tray is constructed with a large number of apertures formed in the bottom surface. The apertures permit the ascending lighter fluid to flow into direct engagement with the heavier fluid that is flowing across the tray from the downcomer described above. When there is sufficient lighter-fluid flow upwardly through the tray, the heavier fluid is prevented from running downwardly through the apertures (referred to as "weeping"). A small degree of weeping is normal in trays while a larger degree of weeping is detrimental to the capacity and efficiency of a tray.

Tray efficiency is also known to be improved in sieve type trays by increasing the froth height of the heavier fluid and reducing the backflow of the heavier fluid flowing across the tray. Froth is created when lighter fluid "bubbles" percolate upwardly through the heavier fluid flowing across the tray. The suspension of the lighter fluid in the heavier fluid prolongs the fluid-fluid contact which enhances the efficiency of the process. The longer the froth is maintained and the higher the froth is established, the greater the fluid-fluid retention. Higher froth requires smaller "bubbles" formed at a sufficiently slow rate. Likewise, backflow occurs beneath the froth when circulating currents of heavier fluid are established during the heavier fluid flow across the plate. This generally forms along the lateral portions thereof. These currents carry the heavier fluid back across the tray in a manner that reduces the concentration-difference driving force for mass transfer. It is the concentration-difference between the lighter fluid and the heavier fluid which enhances the effectiveness of the fluid-fluid contact.

The concentration-difference between the lighter fluid and the heavier fluid can be effected in many ways; some reducing efficiency. For example, as operating pressure increases, the heavier fluid begins to absorb lighter fluid as it moves across a tray. This is above that normally dissolved in the heavier fluid and represents much larger amounts of lighter-fluid bubbles that are commingled or "entrained" with the heavier fluid. This lighter fluid is not firmly held and is released within the downcomer, and, in fact, the majority of said lighter fluid must be released otherwise the downcomer cannot accommodate the heavier fluid/lighter fluid mixture and will flood, thus preventing successful tower operation. This phenomena is generally deemed to occur when operating pressure is such as to produce a lighter fluid density above about 1.0 lbs/cu. ft. and typically amounts to about 10 to 20% of the lighter fluid by volume. For conventional trays, as shown below, the released lighter fluid must oppose the descending frothy lighter fluid/heavier fluid mixture flowing over the weir into the downcomer. In many cases, such opposition leads to poor tower operation and premature flooding.

When a vapor comprises the lighter fluid and a liquid comprises the heavier fluid, there are specific performance issues. Certain performance and design issues are seen in the publication "Distillation Tray Fundamentals", M. J. Lockett, Cambridge University Press, 1986. Other examples are seen in several prior art patents, which include U.S. Pat. Nos. 3,959,419, 4,604,247 and 4,597,916, each assigned Glitsch, Inc., and U.S. Pat. No. 4,603,022 issued to Mitsubishi Jukogyo Kabushiki Kaisha of Tokyo, Japan. A particularly relevant reference is seen in U.S. Pat. No. 4,499,035 assigned to Union Carbide Corporation that teaches a gas-liquid contacting tray with improved inlet bubbling means. A cross-flow tray of the type described above is therein shown with improved means for initiating bubble activity at the tray inlet comprising spaced apart, imperforate wall members extending substantially vertically upwardly and transverse to the liquid flow path. The structural configuration is said to promote activity over a larger tray surface than that afforded by simple perforated tray assemblies. This is accomplished in part by providing a raised region adjacent the downcomer area for facilitating gas ascension therethrough.

U.S. Pat. No. 4,550,000 assigned to Shell Oil Company teaches an apparatus for contacting a liquid with a gas in a relationship between vertically stacked trays in a tower. The apertures in a given tray are provided for the passage of gas in a manner less hampered by liquid coming from a discharge means of the next upper tray. This is provided by perforated housings secured to the tray deck beneath the downcomers for breaking up the descending liquid flow. Such advances in tray designs improve efficiency within the confines of prior art structures. Likewise, U.S. Pat. No. 4,543,219 assigned to Nippon Kayaku Kabushiki Kaisha of Tokyo, Japan teaches a baffle-tray tower. The operational parameters of high gas-liquid contact efficiency and the need for low pressure loss are set forth. Such references are useful in illustrating the need for high efficiency lighter fluid/heavier fluid contact in tray process towers. U.S. Pat. No. 4,504,426 issued to Karl T. Chuang et. al. and assigned to Atomic Energy of Canada Limited is yet another example of gas-liquid contacting apparatus.

Several prior patents have specifically addressed the tray design and the apertures in the active tray deck area itself. For example, U.S. Pat. No. 3,146,280 is a 1964 patent teaching a directional float valve. The gas is induced to discharge from the inclined valve in a predefined direction depending on the orientation of the valve in the tray deck. Such valve configurations are often designed for particular applications and flow characteristics. Tray valves with weighted sides and various shapes have thus found widespread acceptance in the prior art. A circular valve structure is shown in U.S. Pat. No. 3,287,004 while a rectangular valve structure is shown in U.S. Pat. No. 2,951,691. Both of these patents issuing to I. E. Nutter, teach specific aspects of gas-liquid contact flow utilizing tray valve systems. Such specialized designs are necessary because lighter fluid/heavier fluid flow problems must be considered for each application in which a tray is fed by a downcomer. The type of flow valve, its orientation, and the lighter-fluid flow apertures for lighter fluid-heavier fluid flow interaction are some of the issues addressed by the present invention.

Addressing specifically now the type of flow valve, its orientation, and the lighter-fluid flow apertures that currently are taught by the prior art. Attention is directed to two patents in which one of the co-inventors of the present application, Michael J. Binkley, is a co-inventor. U.S. Pat. Nos. 5,147,584 and 5,120,474, both teach certain valve-tray designs and contact tray assemblies and methods. In the contact tray assemblies and the valve designs, it may be seen that the individual valves whether fixed or floating, are illustrated in the drawings with solid surfaces. In other words, both the front and rear legs, as well as the top surface of the valves, whether floating or fixed, are shown to be of solid construction. Other contact-tray valve assemblies are set forth and shown in U.S. Pat. Nos. 6,145,816; 5,911,922; 5,762,834; and 6,089,550. Each of these patents further illustrate aspects of contact tray assemblies and methods as well as valve designs. Additional patents which should likewise be reviewed relative to contact trays include the following four patents in which the Applicant hereof, Michael J. Binkley, is a co-inventor and include: U.S. Pat. Nos. 5,453,222; 4,956,127; 5,106,556; 5,277,848; and 5,192,466. The above-referenced patents and statements with regard to the related art are set forth for purposes of understanding the intricacies of the design considerations in contact-tray assembly and method configurations. It would be an advantage to provide a method of and apparatus for enhanced fluid flow manifesting increased efficiency with a valve design having either a fixed or floating configuration relative to the tray and with multiple fluid-flow apertures formed therein for enhanced fluid interaction. The methods of and apparatus for valve tray assemblies and methods are herein set forth and shown.

SUMMARY OF THE INVENTION

A tray valve assembly for a process column of a type wherein a first, heavier fluid flows downwardly from a downcomer onto a tray and thereacross in a first direction through which a second, lighter fluid flows upwardly therethrough for interaction and mass transfer with the heavier fluid before passing therefrom. The assembly comprises a plurality of apertures formed on a surface of the tray for facilitating the lighter fluid flow upwardly therethrough, a plurality of valves disposed across the surface of the tray and mounted above the plurality of apertures formed on the surface of the tray, each valve of the plurality of valves comprising a top surface and at least one securement leg, and a first securement leg of the at least one securement leg is adapted to intercept the heavier fluid flow in the first direction forming a diverting baffle for engaging the heavier fluid flow across the tray. Each valve of the plurality of valves comprising at least one aperture to facilitate the lighter fluid flow therefrom and further comprising a first aperture in the first securement leg wherein the first aperture is adapted to allow the lighter fluid to flow in a second direction to interact with the heavier fluid flow in the first direction for lighter fluid aeration thereof. Each valve of the plurality valves comprising a plurality of open side regions for allowing ascending lighter fluid flow to pass outwardly therefrom in generally oppositely dispersed directions for contact with the heavier fluid flow in the first direction and each valve of the plurality of valves is adapted to allow the ascending lighter fluid flow to pass outwardly therefrom generally in the first direction of the heavier fluid flow passing over the top surface for facilitating a propulsion of the heavier fluid flow therefrom and across the tray.

A method of mixing a first, heavier fluid flowing downwardly from a downcomer onto a tray and thereacross in a first direction with a second, lighter fluid flowing upwardly therethrough for interaction and mass transfer with the heavier fluid before passing therefrom. The method includes forming, on a surface of the tray, a plurality of apertures for facilitating the lighter fluid flow upwardly therethrough, disposing, above the plurality of apertures formed on the surface of the tray, a plurality of valves, wherein each valve of the plurality of valves comprising a top surface and at least one securement leg, and intercepting, via a first securement leg of the at least one securement leg, the heavier fluid flow in the first direction to form a diverting baffle for engaging the heavier fluid flow across the tray. The method further includes forming, in each valve of the plurality of valves, a plurality of apertures to facilitate the lighter fluid flow therefrom, wherein a first aperture is formed in the first securement leg, allowing, via the first aperture, the lighter fluid to flow in a second direction to interact with the heavier liquid flow in the first direction for lighter fluid aeration thereof, allowing, via a plurality of open side regions, the ascending lighter fluid flow to pass outwardly therefrom in generally oppositely disposed directions for contact with the heavier fluid flow in the first direction, and allowing, via each valve of the plurality of valves, ascending lighter fluid flow to pass outwardly therefrom generally in the first direction of heavier fluid flow passing over the top surface for facilitating a propulsion of the heavier fluid flow therefrom and across the tray.

A valve for use in a tray valve assembly for a process column of a type wherein a first, heavier fluid flows downwardly from a downcomer onto a tray and thereacross in a first direction through which a second, lighter fluid flows upwardly therethrough for interaction and mass transfer with the heavier fluid before passing therefrom. The valve includes at least one securement leg having a first aperture formed therein, a top surface having a second aperture formed therein, a plurality of open side valve regions, and a first securement leg of the at least one securement leg being adapted to intercept the heavier fluid flow in the first direction forming a diverting baffle for engaging the heavier fluid flow across the tray. The first aperture being adapted to allow the lighter fluid to flow in a second direction to interact with the heavier fluid flow in the first direction for lighter fluid aeration thereof. The plurality of open side valve regions being adapted to allow ascending lighter fluid flow to pass outwardly therefrom in generally oppositely disposed directions for contact with the heavier fluid flow in the first direction. The valve is further adapted to allow the ascending lighter fluid flow to pass outwardly therefrom generally in the first direction of the heavier fluid flow passing over the top surface for facilitating a propulsion of the heavier fluid flow therefrom and across the tray.

A valve for use in a tray valve assembly for a process column of a type wherein a first, heavier fluid flows downwardly from a downcomer onto a tray and thereacross in a first direction through which a second, lighter fluid flows upwardly therethrough for interaction and mass transfer with the heavier fluid before passing therefrom. The valve includes a first securement leg having at least a first aperture formed therein, a second securement leg having at least a second aperture formed therein, a plurality of open side valve regions, the first securement leg being adapted to intercept the heavier fluid flow in the first direction forming a diverting baffle for engaging the heavier fluid flow across the tray. The first aperture being adapted to allow the lighter fluid to flow in a second direction to interact with the heavier fluid flow in the first direction for lighter fluid aeration thereof. The plurality of open side valve regions being adapted to allow the ascending lighter fluid flow to pass outwardly therefrom in generally oppositely disposed directions for contact with the heavier fluid flow in the first direction. The valve is further adapted to allow the ascending lighter fluid flow to pass outwardly therefrom generally in the first direction of the heavier fluid flow for facilitating a propulsion of the heavier fluid flow therefrom and across the tray.

BRIEF DESCRIPTION OF THE DRAWINGS

A more complete understanding of the method and system of the present invention may be obtained by reference to the following Detailed Description when taken in conjunction with the accompanying Drawings wherein.

DETAILED DESCRIPTION OF THE PREFERRED EMBODIMENT

Various embodiments of the present invention will now be described more fully with reference to the accompanying drawings. The invention may, however, be embodied in many different forms and should not be constructed as limited to the embodiments set forth herein; rather, the embodiments are provided so that this disclosure will be thorough and complete, and will fully convey the scope of the invention to those skilled in the art.

Figure 1:
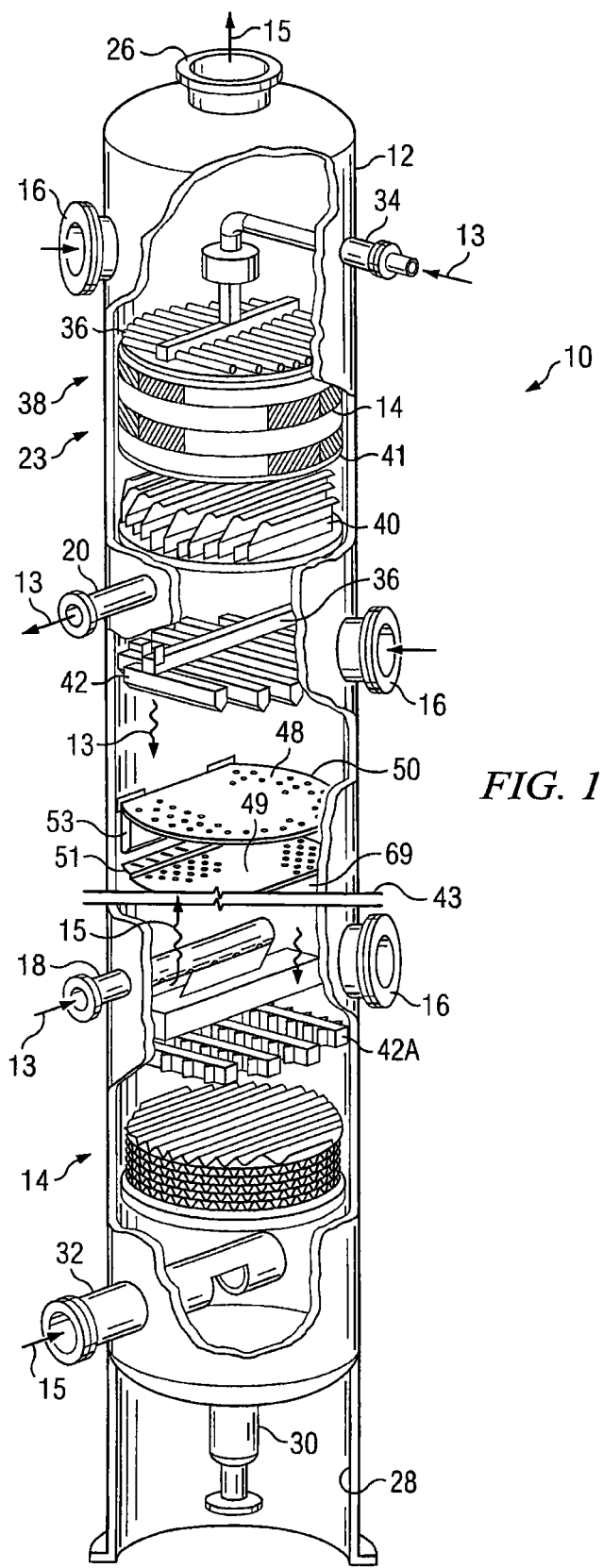
FIG. 1 is a perspective view of a prior art packed column with various sections cut away for illustrating, diagrammatically, a variety of tower.

Referring first to FIG. 1, there is shown a fragmentary, perspective view of an illustrative prior art packed exchange tower or column 12 with various sections cut away for showing a variety of tower internals and the utilization of one embodiment of an improved high-capacity tray assembly. The exchange column 10 of FIG. 1 comprises a cylindrical tower 12 having a plurality of packing bed layers 14 and trays disposed therein. A plurality of manways 16 are likewise constructed for facilitating access to the internal region of the tower 12. Also provided are side stream draw-off line 20, heavier-fluid side feed line 18, and side stream lighter-fluid feed line or reboiler return line 32. A reflux return line 34 is provided atop the column 10.

In operation, heavier fluid 13 is fed into the column 10 through reflux return line 34 and side stream feed-input feed line 18. The heavier fluid 13 flows downwardly through the tower 12 and ultimately leaves the tower 12 either at side stream draw-off line 20, or at bottom-stream draw-off line 30. In the case of a vapor-liquid tower, the heavier fluid 13, during its downward flow, is depleted of some material which evaporate from it as it passes through the trays and packing beds, and is enriched or added to by material which condenses into it out of the lighter fluid stream.

Still referring to FIG. 1, the exchange column 10 is diagrammatically cut in half for purposes of clarity. In this illustration, the column 10 includes a lighter-fluid outlet in overhead line 26 disposed atop the tower 12 and a lower skirt 28 disposed in the lower region of the tower 12 around bottom stream takeoff line 30 coupled to a reboiler (not explicitly shown). Reboiler return conduit 32 is shown disposed above the lower skirt 28 for recycling lighter fluid therein upwardly through the trays and/or packing layers 14. Reflux from condensers is provided in the upper tower region 23 through entry conduit 34 wherein reflux is distributed throughout a distributor 36 across upper packing bed 38. According to exemplary embodiments, the upper packing bed 38 is of the structured packing variety. The regions of the exchange column 10 beneath the upper packing bed 38 are shown for the purpose of illustration and include a heavier fluid collector 40 disposed beneath a support grid 41 in support of the upper structured packing 38. The column 10 is presented with cut-line 43 for illustrating the fact that the tower internals arrangement is diagrammatical only and is provided for referencing various component arrays therein.

Referring still to FIG. 1, an assembly of a pair of trays is also shown for purposes of illustration. In many instances, process columns contain only packing, only trays, or combinations of packing and trays. The present illustration is, however, a combination for purposes of discussion of the overall tower and its operation. A trayed column usually contains a plurality of trays 48 of the type shown herein. In many instances, the trays 48 are valve or sieve trays. According to an exemplary embodiment, the trays 48 are valve trays. The trays 48 comprise plates which may be, for example, punched or slotted in construction. Within the scope of the invention and for the purposes of the description of various embodiments herein, the configuration referred to as a "valve" includes anything at the intersection of and facilitating the contact between a lighter fluid and a heavier fluid. The lighter fluid and the heavier fluid engage at or along the tray 48 and, in some assemblies, are permitted to flow through the same openings in a counter-current flow arrangement. Optimally, the lighter-fluid and heavier-fluid flows reach a level of stability. With the utilization of appropriate downcomers, to be described in more detail below, this stability may be achieved with a relatively low flow rate permitting the ascending lighter fluid to mix with the descending heavier fluid. In some embodiments, no downcomers are used and the lighter fluid and the heavier fluid use the same openings, alternating as the respective pressures change.

According to an exemplary embodiment, cross-flow valve trays 48 and 49 and downcomers 53 and 69 are illustrated. Tray 48 is constructed with a plurality of floating valves. Tray 49 also illustrates a raised inlet section 51 beneath downcomer 53, which is substantially planar, formed with a plurality of apertures, and which may include a series of momentum deflector barriers, as will be described below. The raised inlet area is described in more detail in U.S. Pat. No. 4,956,127 (the '127 patent). Corrosion is another consideration in designing packed towers and for the selection of the material, design, and the fabrication of the tower internals.

Figure 2:
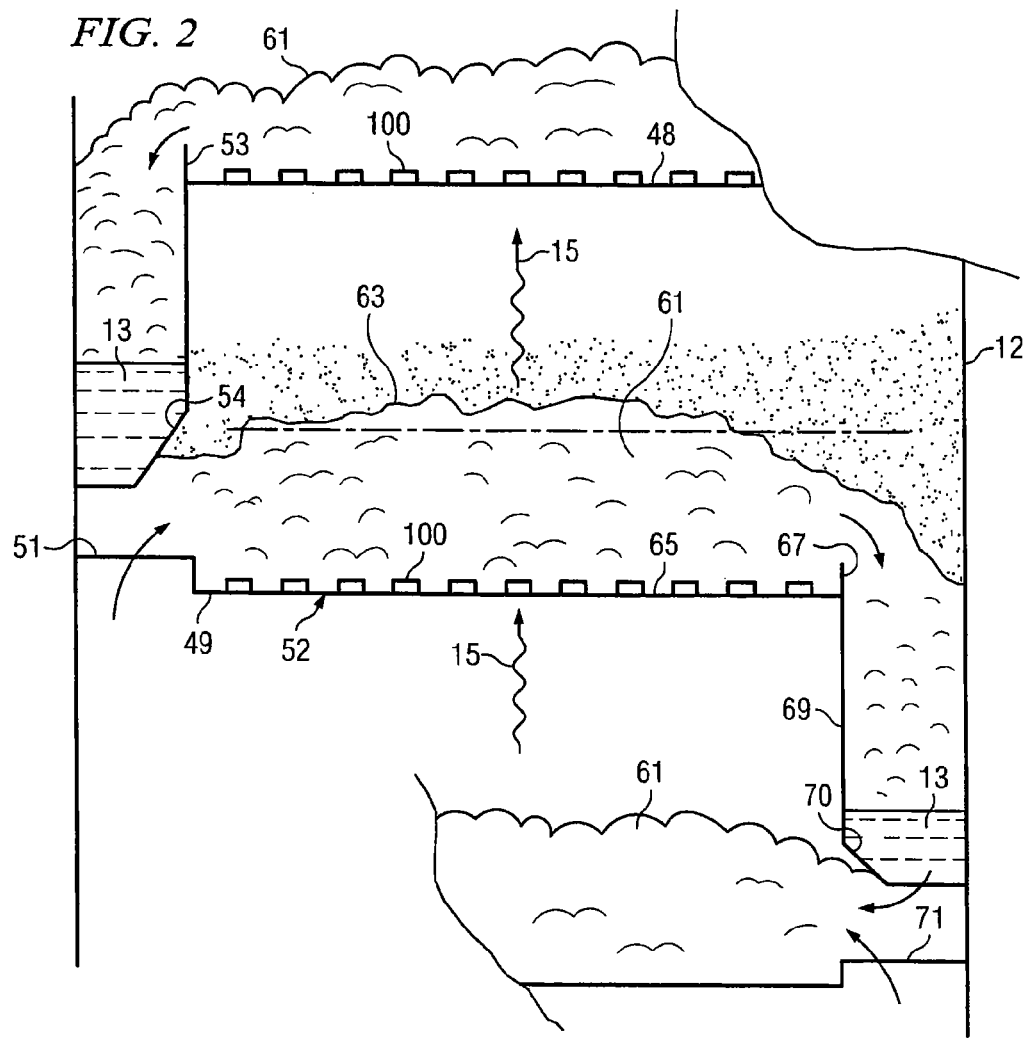
FIG. 2 is a diagrammatic, side-elevational, cross-sectional view of a prior art downcomer-tray assembly secured within a process tower and illustrating the flow of heavier fluid thereacross and lighter fluid upwardly therethrough.

Referring now to FIG. 2, there is shown a is a diagrammatic, side-elevational, cross-sectional view of a prior art downcomer-tray assembly secured within a process tower and illustrating the flow of heavier fluid thereacross and lighter fluid upwardly therethrough. An upper tray 48 comprises a first valved panel. The lower tray 49 is also of generally planar construction across its central active area 52, having a plurality of valves 100 mounted thereon, disposed therein, or formed therefrom as diagrammatically shown. Heavier fluid 13 travels down a downcomer 53 having a tapered or mitered bottom section 54, from tray 48 disposed thereabove. The tapered section 54 of the downcomer provides a clearance angle for lighter fluid flow from the active inlet area, which clearance angle affords a horizontal flow vector to the lighter fluid vented through raised panel 51. The heavier fluid 13 engages lighter fluid 15 discharged from the raised active panel area 51 beneath the downcomer 53.

Still referring to FIG. 2, the froth 61 extends with a relatively uniform height, shown in phantom by line 63 across the width of the tray 49 to the opposite end 65 where a weir 67 is established for maintaining the froth height 63. The accumulated froth at this point flows over the top of the weir 67 into associated downcomer 69 that carries the froth downwardly into a mitered region 70 where the heavier fluid accumulates and disperses upon active inlet region 71 therebeneath. Again active inlet region 71 is shown herein diagrammatically for purposes of illustration only. As stated herein, the area of holes and perforations for a single cross-flow plate establish the active length of the plate and the zone in which the froth 61 is established. It should be noted that the present invention would also be applicable to multiple downcomer configurations, wherein the downcomers and raised, active inlet areas (if incorporated) may be positioned in intermediate areas of the trays as also described below. By increasing the total active area of active inlet areas 51 and 71, greater capacity and efficiency is achieved. It is also the manner of flow of the heavier fluid 13 across the tray 49 which is critical to tray efficiency.

Figure 3:
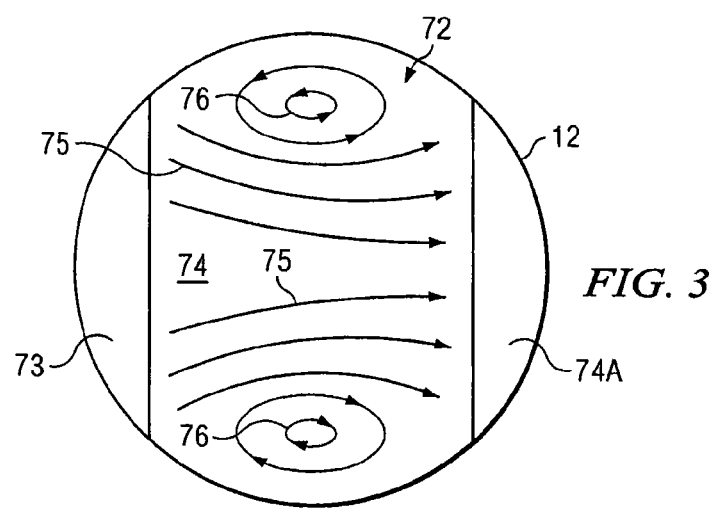
FIG. 3 is a top-plan, diagrammatic view of a prior art tray illustrating problems with fluid flow thereacross.

Referring now to FIG. 3, there is shown a top-plan, diagrammatic view of a prior art tray illustrating problems with fluid flow thereacrossthere. The prior art tray 72 is illustrated herein as a round unit having a first conventional downcomer for feeding heavier fluid upon a solid, underlying panel 73 and then to the tray 74. A second downcomer 74A carries heavier fluid away from the tray. A plurality of arrows 75 illustrate the non-uniform flow of heavier fluid 13 typically observed across a conventional prior art tray which does not address the circulation issue. Circular flow is shown to be formed on both sides of the plate lateral to the direction of primary flow. The formation of these retrograde flow areas, or recirculation cells 76, decreases the efficiency of the tray. Recirculation cells 76 are the result of retrograde flow near the walls of the process column and this backflow problem becomes more pronounced as the diameter of the column increases. With the increase in retrograde flow and the resultant stagnation effect from the recirculation cells, concentration-difference driving force for mass transfer between the counter-flowing streams is reduced. The reduction in concentration-difference driving force will result in more contact or height requirement for a given separation in the column. Although back mixing is but a single aspect of plate efficiency, the reduction thereof is provided concurrently with the other advantages hereof. Reference is again made to the plate efficiency discussion set forth in above referenced '127 patent.

Figure 4:
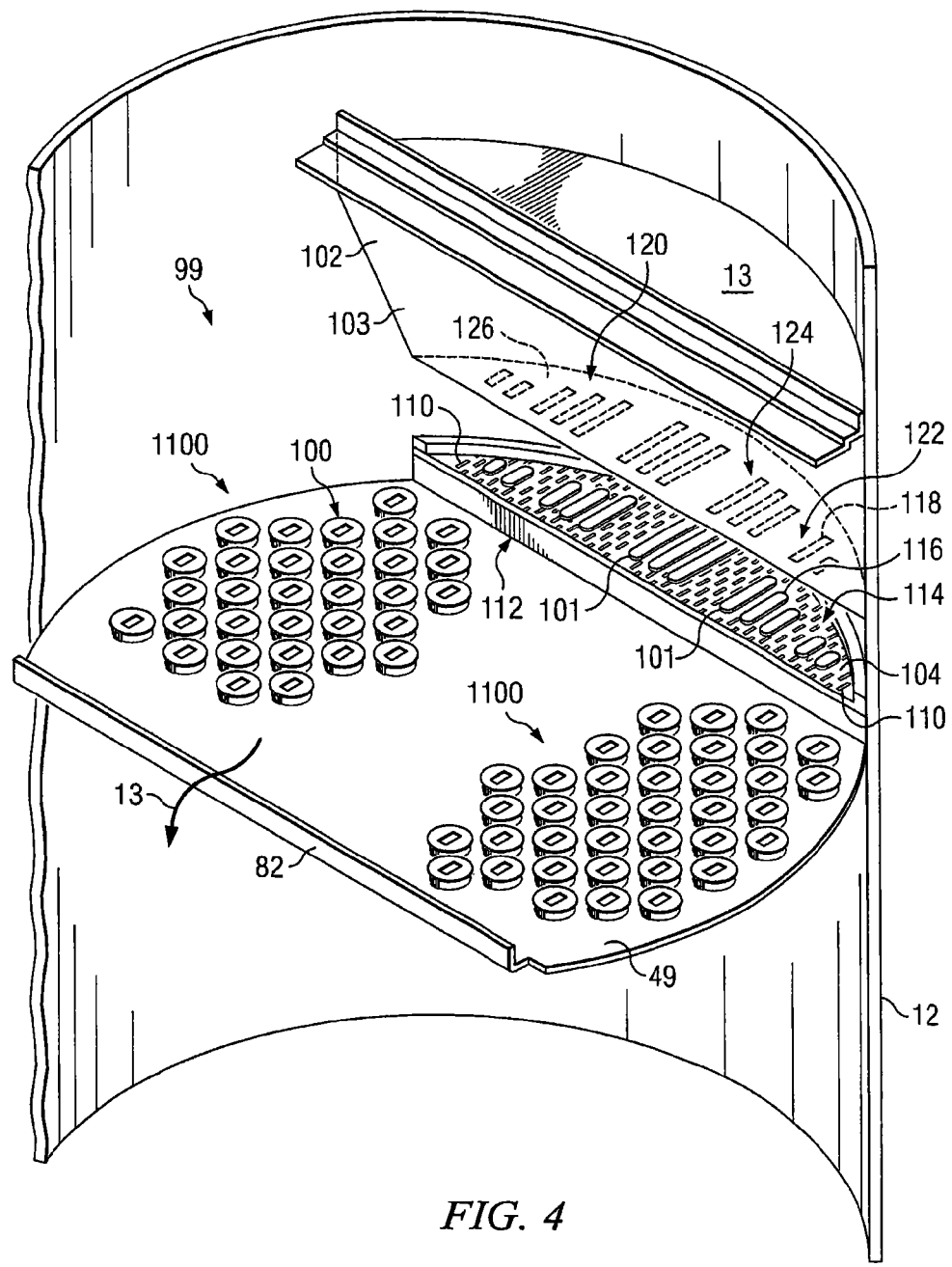
FIG. 4 is a perspective view of one embodiment of a downcomer-tray assembly constructed in accordance with the principles of the present invention and having portions thereof cut away for purposes of clarity.

Referring now to FIG. 4, there is shown a perspective view of a downcomer-tray assembly 99 constructed in accordance with principles of the present invention and having portions thereof cut away for purposes of clarity and illustrated with a downcomer and raised inlet region. Conventional materials such as, for example, stainless steel or other corrosion resistant material may be utilized, as is well known in the art. The tray 49, as shown herein, is also constructed for placement in the tower 12 by conventional means. In the tower, a feeding downcomer 102, having an inclined face 103, is disposed over a raised inlet region 104 for discharging heavier fluid 13 to tray 49. A weir 82 is disposed on the opposite side of tray 49 whereby a second downcomer is disposed for carrying heavier fluid 13 away from the tray 49. Heavier fluid 13 spills down upon the inlet region 104 and over upstanding edge 112 onto the tray 49. It should be noted that neither the downcomer nor the raised inlet region 104 is a part of the present invention.

Still referring to FIG. 4, there is shown a plurality of valves 100 uniformly spread across tray 49. The plurality of valves 100 are diagrammatically shown, but, as will be more fully described below, the plurality of valves 100 can be formed in both "fixed" and "floating" configurations. In one embodiment, the plurality of valves 100 are uniformly disposed across the entire surface of tray 49. However, various other embodiments are contemplated where the pattern of the plurality of valves 100 is staggered or varied across a single tray 49. As will be described in more detail below, the heavier fluid 13, flowing across the tray 49, encounters a lighter fluid 15 flowing up through the plurality of valves 100 for interaction therewith. The design of the plurality of valves 100 is configured to increase the efficiency of that interaction.

In one embodiment, the plurality of valves 100 are diagrammatically shown as rectangles, but, as will be more fully described below, the plurality of valves 100 can be formed of a plurality of shapes. In one embodiment, the valves 100 are uniformly disposed across the entire surface of tray 49. For example, FIG. 4 shows a portion of two different exemplary uniform patterns 1100.

Figure 5:
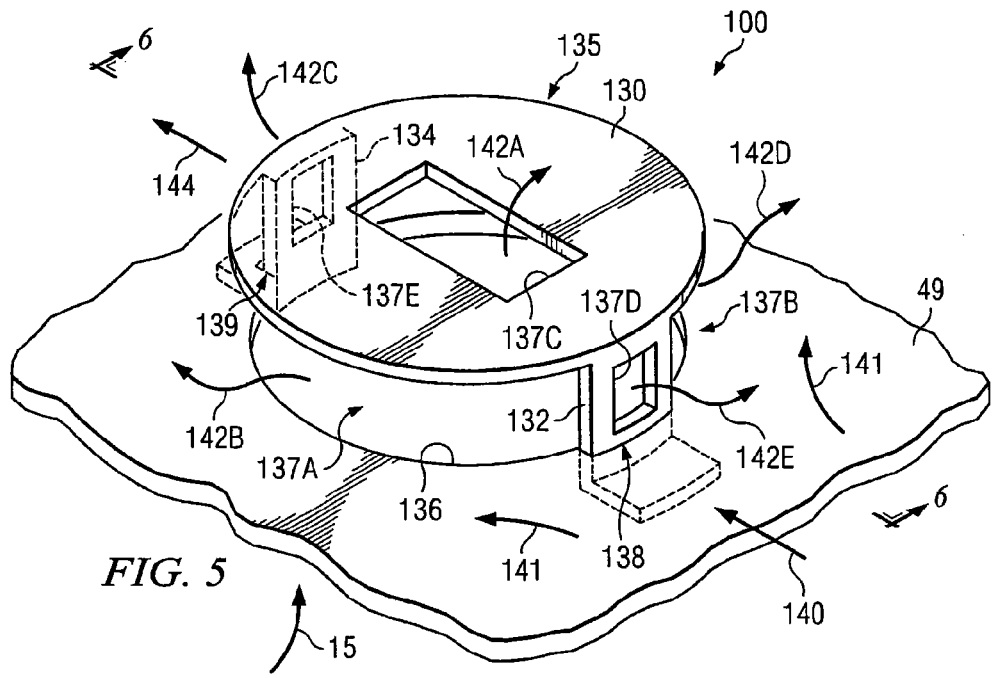
FIG. 5 is an enlarged perspective view of one valve of the tray surface in accordance with an embodiment of the present invention.

Referring now to FIG. 5, there is shown an enlarged perspective view of a floating valve 100 in accordance with an embodiment of the present invention. The floating valve 100 is a separate structure inserted into tray 49. The floating valve 100 comprises a front securement leg 132 and a rear securement leg 134 depending from a generally circular top surface 130. According to an exemplary embodiment, the top surface 130 comprises a circular disc. The floating valve 100 is mounted within the surface of tray 49 and disposed above an aperture 136 formed therein. The aperture 136 includes a pair of slotted regions 138 and 139 adapted for receiving the securement legs 132 and 134, respectively. There are multiple advantages in utilizing this type of floating valve 100. The orientation of the floating valve 100 relative to the heavier fluid flow is determined by the alignment and spacing of the slotted regions 138 and 139 which allows for not only the upward flotation of the circular disc 130 for the passage of lighter fluid therebeneath, but also the secured orientation thereof. It is important that the valves 100 maintain the orientation shown in FIG. 4. According to exemplary embodiments, the floating valve 100 acts as a deflecting plate that deflects impinging fluid-flow across the tray 49 in order to disperse rising fluid 15 coming through the tray 49 into heavier fluid 140 stream thereacross.

The floating valve 100 includes one or more apertures on each surface thereof. In one embodiment, the valve 100 has one aperture on three surfaces forming three distinct apertures therein. Aperture 137C is formed in the top surface 130 thereof while upstream aperture 137D is formed in the front securement leg 132 thereof and downstream aperture 137E is formed in the rear securement leg 134 thereof. These apertures 137C, 137D, 137E in conjunction with the open valve areas 137A and 137B, permit an improved lighter fluid/ heavier fluid interaction due to the multiplicity of lighter-fluid flow areas constructed with the valve 100. According to an exemplary embodiment, the size of the valve 100 has been shown to be effective in the assembly of a tray having an active area with approximately 25-50 valves per square foot. Other sizes are, of course, contemplated by the present invention. This valve density per square foot is substantially higher than possible with valves of the conventional size of 1 1/2" to 17/8" in diameter. Prior art valve density on the order of 12-14 valves per square foot has been common. The increased density is a result of the smaller size of valve 100 and its directional thrust design as herein described, which permits it to be spaced close to adjacent valves as shown. The various embodiments of the present invention are a marked advance over prior art designs utilizing larger valves and broader spacing. The efficiency of the tray is thought to be enhanced therefrom.

Still referring to FIG. 5, heavier-fluid flow is illustrated with arrow 140 flowing in a direction of the circular disc 130. As the heavier-fluid flow 140 engages the frontal leg 132 of the floating valve 100, it is seen to split into bi-directional flow 141 traveling around the circumference of the circular aperture 136. Lighter fluid 15 venting beneath circular disc 130 is represented by arrows 142A, 142B, 142C, 142D, and 142E, which arrows illustrate the biased direction that the lighter fluid 15 has in discharge from beneath the circular disc 130. More particularly, it is shown in FIG. 5 how the heavier-fluid flow 140 interacts with the lighter-fluid flow 15 due to the multiplicity of apertures formed in the valve 100. As shown herein and as described above, the floating valve 100 is constructed with the multiplicity of areas for lighter-fluid flow, including open side regions 137A and 137B, top aperture 137C, upstream aperture 137D, and downstream aperture 137E. It may be seen that the lighter fluid flow 142A, 142B, 142C, 142D and 142E each extend through their respective valve openings 137A and 137B as well as apertures 137C, 137D and 137E. These lighter-fluid flow areas allow interaction between the lighter fluid 15 and the heavier fluid 140 in such a way that maximum interaction is afforded.

Referring still to FIG. 5, it may be seen that the orientation of the floating valve 100 both induces the lighter fluid flow 142C to be in a direction substantially along the path of the heavier fluid flow 140 to further promote the directional flow of heavier fluid as well as the lighter fluid flow 142E occurring against the path of the heavier fluid flow 140 to further enhance interaction. It should be noted that the "directional thrust" aspect of the valve is provided in conjunction with the multiple-aperture interaction therein afforded by the multiple apertures across the legs and top surface thereof to further enhance the heavier fluid/lighter fluid interaction.

Figure 6:
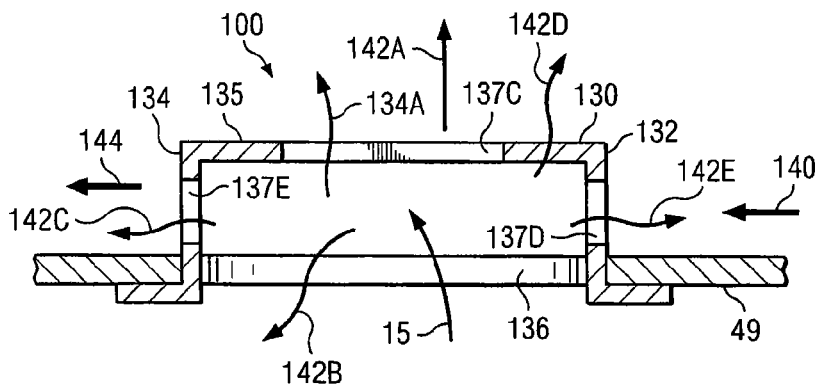
FIG. 6 is a side-elevational cross-sectional view of the valve structure of FIG. 5 in accordance with an embodiment of the present invention.

Referring now to FIG. 6 there is shown, according to an exemplary embodiment, the floating valve 100 including top surface 130 containing aperture 137C of FIG. 5 in a side elevational, cross-section view. Front securement leg 132 is seen to include upstream aperture 137D for affording lighter fluid/heavier fluid interaction with heavier-fluid flow 140 coming across the tray 49. Lighter fluid 15 ascending through the tray 49 is exhausted as represented by arrows 142A, 142B, 142C, 142D and 142E. The escaping lighter fluid flow represented by arrows 142A, 142B, 142C, 142D, and 142E interacts immediately with heavier fluid flow 140 and continues downstream of the rear securement leg 134 having downstream aperture 137E formed therein. In one embodiment, the aperture on the top surface or leg surface is punched to leave a tab that also functions as a deflection surface.

Figure 7:
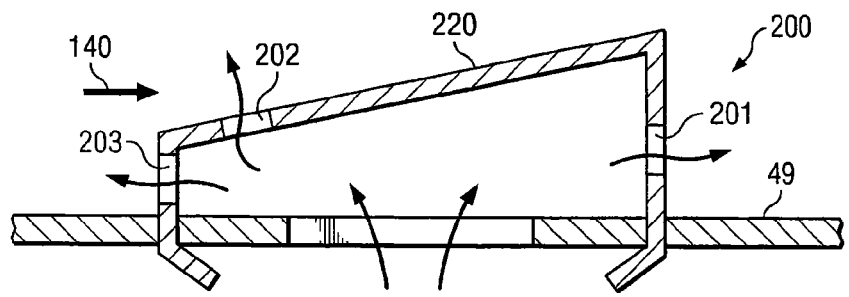
FIG. 7 is a side-elevational view of an alternative embodiment of the valve structure of FIG. 5 in accordance with an embodiment of the present invention.

Referring now to FIG. 7 there is shown a side-elevational view of an alternative embodiment of a valve structure in accordance with an embodiment of the present invention. Tray 49 includes a valve 200 which is constructed with a downstream aperture 201, a top aperture 202, and an upstream aperture 203 which further facilitate lighter-fluid dispersion therefrom in conjunction with the dispersion of lighter fluid through the openings at the sides of the valve as described above. In this particular embodiment, a floating valve 200 is seen with an angulated top surface 220 relative the flow of flow 140 of heavier fluid thereacross. In this embodiment the angulated top surface 220 of the floating valve 200 faces the incoming flow 140 to enhance the fluid-fluid interaction and reduce resistance to heavy fluid flow, however, the angulated top surface 220 may be angulated in the opposite direction or any other direction depending on the design requirements. It should further be noted that valves of both floating and fixed configuration are contemplated by the spirit and scope of the present invention.

Figure 8:
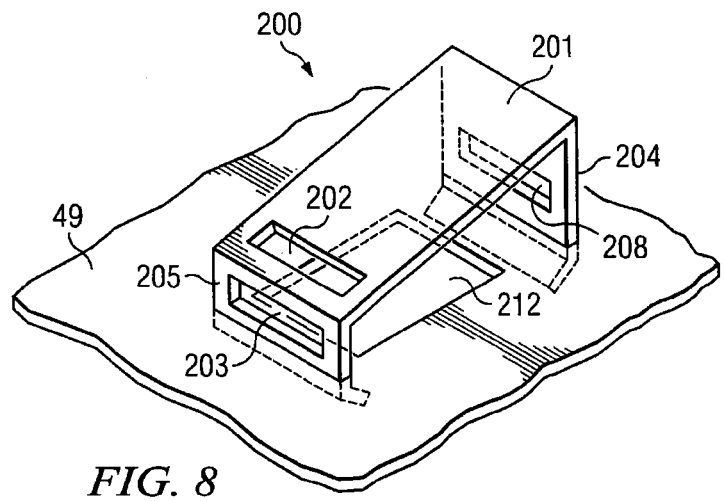
FIG. 8 is a perspective view of a valve structure comprising a fixed rectangular valve assembly in accordance with an embodiment of the present invention.

Referring now to FIG. 8, there is illustrated a perspective view of a valve structure 200 comprising a fixed rectangular valve assembly in accordance with an embodiment of the present invention. The fixed valve 200 comprises a front securement leg 204 and a rear securement leg 205 depending from a generally rectangular top surface 201. The fixed valve 200 is mounted within the surface of tray 49 and disposed above an aperture 212 formed therein. The fixed valve 200 includes one or more apertures on each surface thereof. In one embodiment, the fixed valve 200 includes one aperture on three surfaces forming three distinct apertures therein. Aperture 202 is formed in the top surface 201 thereof while aperture 208 is formed in the front securement leg 204 thereof and aperture 203 is formed in the rear securement leg 205 thereof. In these embodiments, the front and rear securement legs 204, 205 extend from the top surface 201 of the fixed valve 200 down to tray 49 and are secured thereagainst. According to an exemplary embodiment, aperture 202 is shown as a slot whose length runs transverse to the length of the top surface 201 of the floating valve 200. However, it is contemplated that the aperture 202 can be of any size and shape and in any direction depending on the design requirements. According to an exemplary embodiment, only fixed rectangular valves 200 are illustrated; however, the valves 200 can be formed in both "fixed" and "floating" configurations.

Figure 9:
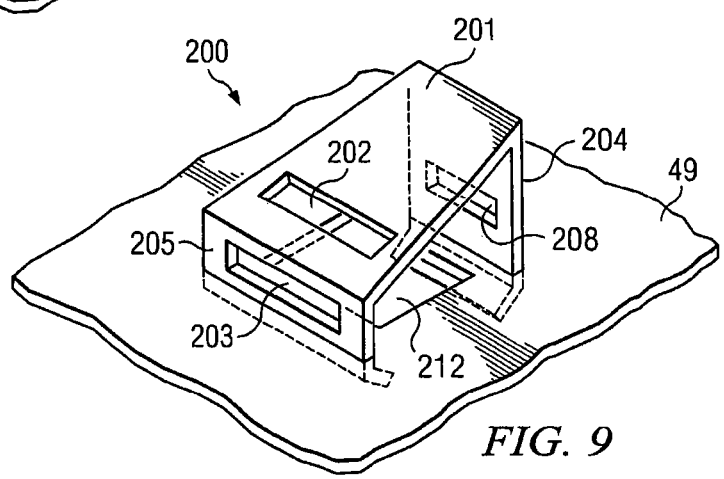
FIG. 9 is a perspective view of a valve structure comprising a fixed trapezoidal valve assembly in accordance with an embodiment of the present invention.

Similarly, FIG. 9, there is illustrated a perspective view of a valve structure 200 comprising a fixed trapezoidal valve assembly in accordance with an embodiment of the present invention. The fixed valve 200 comprises a front securement leg 204 and a rear securement leg 205 depending from a generally trapezoidal top surface 201. The fixed valve 200 is mounted within the surface of tray 49 and disposed above an aperture formed therein. The fixed trapezoidal valve 200 includes one or more apertures on each surface thereof. In one embodiment, the fixed valve 200 has one aperture on three surfaces forming three distinct apertures therein. Aperture 202 is formed in the top surface 201 thereof while aperture 208 is formed in the front securement leg 204 thereof and aperture 203 is formed in the rear securement leg 205 thereof. Apertures 202, 203, 208 operate to allow the discharge of lighter fluid therefrom. In these embodiments, the front and rear securement legs 204, 205 extend from the top surface 201 of the fixed valve 200 down to tray 49 and are secured thereagainst. According to an exemplary embodiment, the aperture 202 is shown as a slot whose length runs transverse to the length of the top surface 201 of the valve 200. However, it is contemplated that the aperture 202 can be of any size and shape and in any direction depending on the design requirements. According to an exemplary embodiment, only fixed trapezoidal valves 200 are illustrated; however, the valves 200 can be formed in both "fixed" and "floating" configurations.

Figure 10:
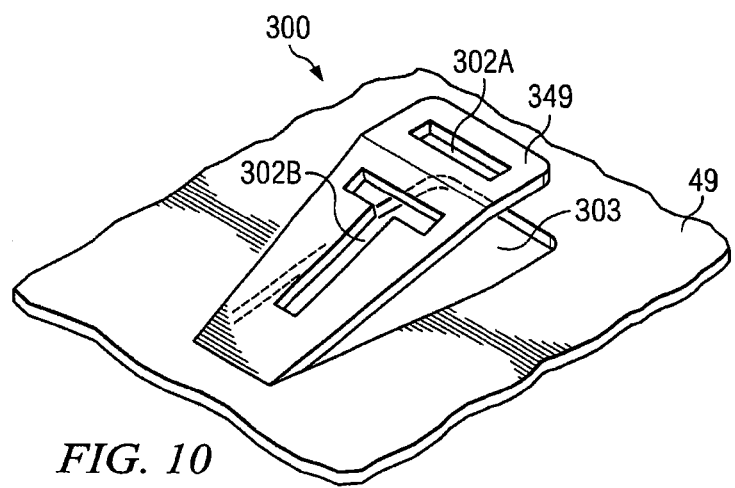
FIG. 10 is a perspective view of a valve assembly comprising a fixed trapezoidal valve assembly in accordance with an embodiment of the present invention.

Referring now to FIG. 10, there is illustrated a perspective view of a valve assembly 300 comprising a fixed trapezoidal valve assembly in accordance with an embodiment of the present invention. The fixed trapezoidal valve 300 is shown made from a protrusion of tray 49. In this embodiment, the fixed trapezoidal valve 300 acts as a deflecting plate that deflects impinging fluid-flow across the tray 49 in order to disperse rising lighter fluid coming through the tray 49 into the heavier fluid stream thereacross. According to an exemplary embodiment, the fixed trapezoidal valve 300 can be an integral unit formed out of the tray 49 or can be a separate structure fastened to the tray 49 at one end. In one embodiment, the fixed trapezoidal valve 300 is formed by punching a hole into the tray 49 of less than 360 degrees so that a tab 349 is formed. The tab 349 includes a top aperture 302A and front aperture 302B. According to an exemplary embodiment, the aperture 302A is shown as a slot whose length runs transverse to the length of the top surface of the tab 349 while aperture 302B is "T" shaped. However, it is contemplated that the apertures 302A and 302B can be of any size and shape and in any direction depending on the design requirements.

In summary, this patent application is provided to further teach the utilization of both fixed and floating valves in a contact tray assembly that is designed to enhance lighter fluid/heavier fluid interaction utilizing a multiplicity of valve configurations. The contact trays may have a plurality of valves of a multitude of shapes. The plurality of valves may have one or more apertures in the top and one or more apertures on one or more legs depending from the top surface.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A tray valve assembly for a process column of a type wherein a first fluid flows downwardly from a downcomer onto a tray and thereacross in a first direction through which a second fluid flows upwardly therethrough for interaction and mass transfer with the heavier fluid before passing therefrom, the assembly comprising:
    a plurality of apertures formed on a surface of the tray for facilitating flow of the second fluid flow upwardly therethrough;
    a plurality of floating valves disposed across the surface of the tray and mounted above the plurality of apertures, each floating valve of the plurality of floating valves comprising a top surface and at least one securement leg operatively coupled to the top surface;
    a first securement leg of the at least one securement leg, the first securement leg being adapted to intercept flow of the first fluid in the first direction by forming a diverting baffle for engaging the first fluid;
    a first aperture disposed in the first securement leg of each floating valve of the plurality of floating valves, the first aperture being operable to allow the second fluid to flow in a second direction to interact with flow of the first fluid in the first direction;
    a plurality of open side regions disposed in each floating valve of the plurality of floating valves for allowing flow of the second fluid to pass outwardly therefrom in generally oppositely dispersed directions for contact with flow of the first fluid in the first direction; and
    wherein each floating valve of the plurality of floating valves allows the flow of the second fluid to pass outwardly therefrom generally in the first direction thereby facilitating a propulsion of the first fluid across the tray.

2. The tray valve assembly of claim 1, wherein each floating valve of the plurality of floating valves is rectangular in shape.

3. The tray valve assembly of claim 1, wherein each floating valve of the plurality of floating valves is trapezoidal in shape.

4. The tray valve assembly of claim 1, wherein each floating valve of the plurality of floating valves is circular in shape.

5. The tray valve assembly of claim 1, wherein each floating valve of the plurality of floating valves comprises a pair of oppositely disposed securement legs.

6. The tray valve assembly of claim 5, wherein each aperture of the plurality of apertures formed on the surface of the first tray comprises a pair of slotted regions that receive the pair of oppositely disposed securement legs.

7. The tray valve assembly of claim 1, wherein the at least one aperture and the plurality of open side regions permit interaction between flow of the first fluid flow and flow of the second fluid to achieve maximum interaction.

8. The tray valve assembly of claim 1, wherein the top surface of each floating valve of the plurality of floating valves comprises a circular disc.

9. The tray valve assembly of claim 1, wherein the top surface of each floating valve of the plurality of floating valves is non-angulated relative to flow of the first fluid in the first direction.

10. The tray valve assembly of claim 1, wherein the top surface of each floating valve of the plurality of floating valves is angulated relative to the flow of the first fluid in the first direction.

11. The tray valve assembly of claim 1, wherein the top surface of each floating valve of the plurality of floating valves comprises at least a second aperture.

12. The tray valve assembly of claim 11, wherein the second aperture allows the second fluid to ascend therethrough for contact with flow of the first fluid in the first direction.

13. The tray valve assembly of claim 1, further comprising a second securement leg of the at least one securement leg having at least a third aperture therein.

14. The tray valve assembly of claim 1, wherein the second fluid comprises a vapor.

15. A method of mixing a first fluid flowing downwardly from a downcomer onto a tray and thereacross in a first direction with a second fluid flowing upwardly therethrough for interaction and mass transfer with the first fluid before passing therefrom, the method comprising:
  forming, on a surface of the tray, a plurality of apertures for facilitating flow of the second fluid upwardly therethrough;
  disposing, above the plurality of apertures formed on the surface of the tray, a plurality of floating valves, wherein each floating valve of the plurality of floating valves comprising a top surface and at least one securement leg operatively coupled to the top surface;
  intercepting, via a first securement leg of the at least one securement leg, flow of the first fluid in the first direction to form a diverting baffle for engaging flow of the first fluid across the tray;
  forming, in each floating valve of the plurality of floating valves, a plurality of apertures to facilitate flow of the second fluid therefrom, wherein at least a first aperture is formed in the first securement leg;
  allowing, via the first aperture, the second fluid to flow in a second direction to interact with the heavier liquid flow in the first direction for lighter fluid aeration thereof;
  allowing, via a plurality of open side regions, flow of the second fluid to pass outwardly therefrom in generally oppositely disposed directions for contact with flow of the first fluid in the first direction; and
  allowing, via each floating valve of the plurality of floating valves, flow of the second fluid to pass outwardly therefrom generally in the first direction thereby facilitating a propulsion of flow of the first fluid across the tray.

16. The method of claim 15, wherein the top surface of each floating valve of the plurality of floating valves is non-angulated relative to flow of the first fluid in the first direction.

17. The method of claim 15, wherein the top surface of each floating valve of the plurality of floating valves is angulated relative to flow of the first fluid in the first direction.

18. The method of claim 15, wherein the top surface of each floating valve of the plurality of floating valves comprises at least a second aperture.

19. The method of claim 18, wherein the second aperture allows the second fluid to ascend therethrough for contact with flow of the first fluid in the first direction.

20. A floating valve for use in a tray valve assembly for a process column of a type wherein a first fluid flows downwardly from a downcomer onto a tray and thereacross in a first direction through which a second fluid flows upwardly therethrough for interaction and mass transfer with the first fluid before passing therefrom, the floating valve comprising:
  a top surface;
  a first securement leg coupled to the top surface, the first securement leg comprising at least a first aperture formed therein;
  a second securement leg coupled to the top surface, the second securement leg comprising at least a second aperture formed therein;
  a plurality of open side valve regions;
  the first securement leg being operable to intercept flow of the first fluid in the first direction by forming a diverting baffle for engaging flow of the first fluid across the tray;
  the first aperture being operable to allow the second fluid to flow in a second direction to interact with flow of the first fluid in the first direction;
  the plurality of open side valve regions allowing flow of the second fluid flow to pass outwardly therefrom in generally oppositely disposed directions for contact with flow of the first fluid in the first direction; and
  the floating valve allowing the second fluid to pass outwardly therefrom generally in the first direction of flow of the first fluid for facilitating a propulsion of the first fluid therefrom and across the tray.

21. The floating valve of claim 20, further comprising a top surface having at least a third aperture formed therein.

22. The floating valve of claim 21, wherein the third aperture allows the second fluid to ascend therethrough for contact with the first fluid.

* * * * *